Nov. 6, 1928.  
W. W. EVANS  
PACKING  
Filed March 3, 1923
1,690,161
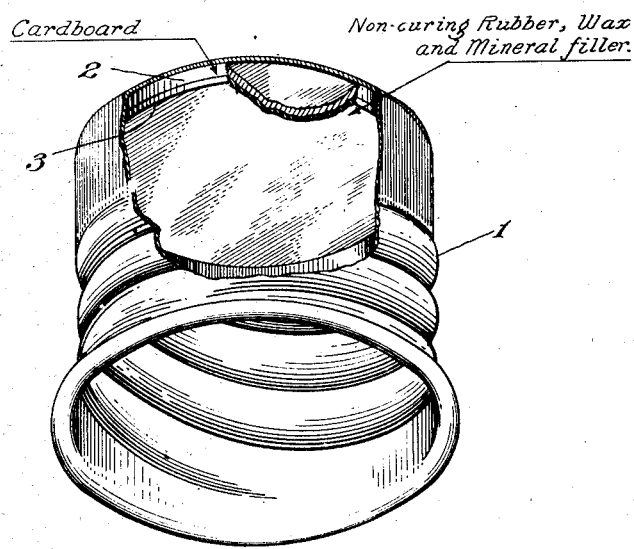
Inventor,  
Walter W. Evans.  
By Robert McPierson  
Att'y.

Patented Nov. 6, 1928.

1,690,161

UNITED STATES PATENT OFFICE.

WALTER W. EVANS, OF AKRON, OHIO, ASSIGNOR TO THE B. F. GOODRICH COMPANY, OF NEW YORK, N. Y., A CORPORATION OF NEW YORK.

PACKING.

Application filed March 3, 1923. Serial No. 622,566.

This invention relates to an improved packing material adapted for various uses, and particularly to be employed in the form of a disk or gasket for bottle seals.

My object is to provide a packing which is substantially inert and impervious to a wide variety of liquid and other substances, including drugs, chemicals and food preparations, which conforms to the edge of and effectively seals an ordinary bottle mouth when used in conjunction with a cap, and which is relatively inexpensive.

The accompanying drawing is a perspective view, partly broken away, showing a bottle cap provided with a packing disk constructed and compounded in accordance with my invention.

In this instance, I have shown in the drawing an ordinary screw metal cap 1, but the invention can be used in connection with any suitable form of cap closure or connection.

The packing element consists of a somewhat compressible backing or foundation 2, such as cardboard, and an adherent, impervious facing 3 including a plastic gum compound of non-curing or unvulcanized rubber and a waxy material such as paraffin wax. The wax serves to plasticize the rubber and give to the facing the necessary impressionability, in connection with the cardboard backing, to fill the irregularities encountered in bottle-mouth rims, and it also renders the rubber waterproof, since unvulcanized rubber will absorb up to 25% of its weight of water. There is also preferably mixed with this plastic material a large proportion of a finely-divided, inert filler, or reenforcing pigment, such as chemically prepared barium sulphate ("blanc fixe"), to add body and stiffness to the plastic and aid in resisting temperature changes.

A preferred composition for the facing is made up, in proportions by weight, substantially as follows:

| | Per cent. |
|---|---|
| Plantation rubber smoked sheets | 35 |
| Barium sulphate | 55 |
| Paraffin wax | 10 |

These materials are thoroughly masticated together on a mill or in a mixer and may be applied to a wide sheet of cardboard in a calender, after which the sheet can be cut into strips and the circular sealing disks stamped or died out of the strips.

The thickness of the backing and facing layers can be more or less varied, but good results have been obtained with a cardboard of .05 inch thickness and a gum facing .015 inch thick. Since the backing 2 is compressible and the facing layer 3 is merely adherent thereto as already stated, it follows that the material of said facing does not substantially impregnate said backing beyond the immediate surface portion thereof, but leaves its resilience substantially unimpaired.

It will be understood that various equivalents may be used, and the proportions and dimensions varied within the scope of my claims. For example, the percentage of barium sulphate may vary from about 55 to about 65 and the rubber from about 35 to about 25, more or less, other waxes than paraffin can be employed, and other fillers than barium sulphate.

I claim:

1. Packing material adapted for bottle-seals and comprising a relatively-thick, resilient backing layer, and a relatively thin, impervious, plastic, facing layer adherent to said backing layer and composed of unvulcanized rubber, wax, and a reenforcing pigment, the backing layer being substantially free from impregnation by the material of the facing layer.

2. Impressionable packing material for bottle seals comprising a compressible cardboard backing layer and a plastic facing adherent thereto and composed of unvulcanized rubber, paraffin wax and a reenforcing pigment.

3. Packing material comprising a compressible cardboard backing layer and a facing consisting of unvulcanized rubber, a powdered mineral filler, and a wax.

4. Packing material comprising a compressible cardboard backing layer and a facing consisting of a major proportion of barium sulphate, a minor proportion of unvulcanized rubber and paraffin wax.

5. Packing material comprising a cardboard layer having a relatively thin facing thereon consisting of substantially 35% of unvulcanized rubber, 55% of barium sulphate and 10% of paraffin wax.

In witness whereof I have hereunto set my hand this 26th day of February, 1923.

WALTER W. EVANS.